No. 728,660. PATENTED MAY 19, 1903.
J. H. BEDINGFIELD.
SEED PLANTER.
APPLICATION FILED JUNE 9, 1902.
NO MODEL. 2 SHEETS—SHEET 2.
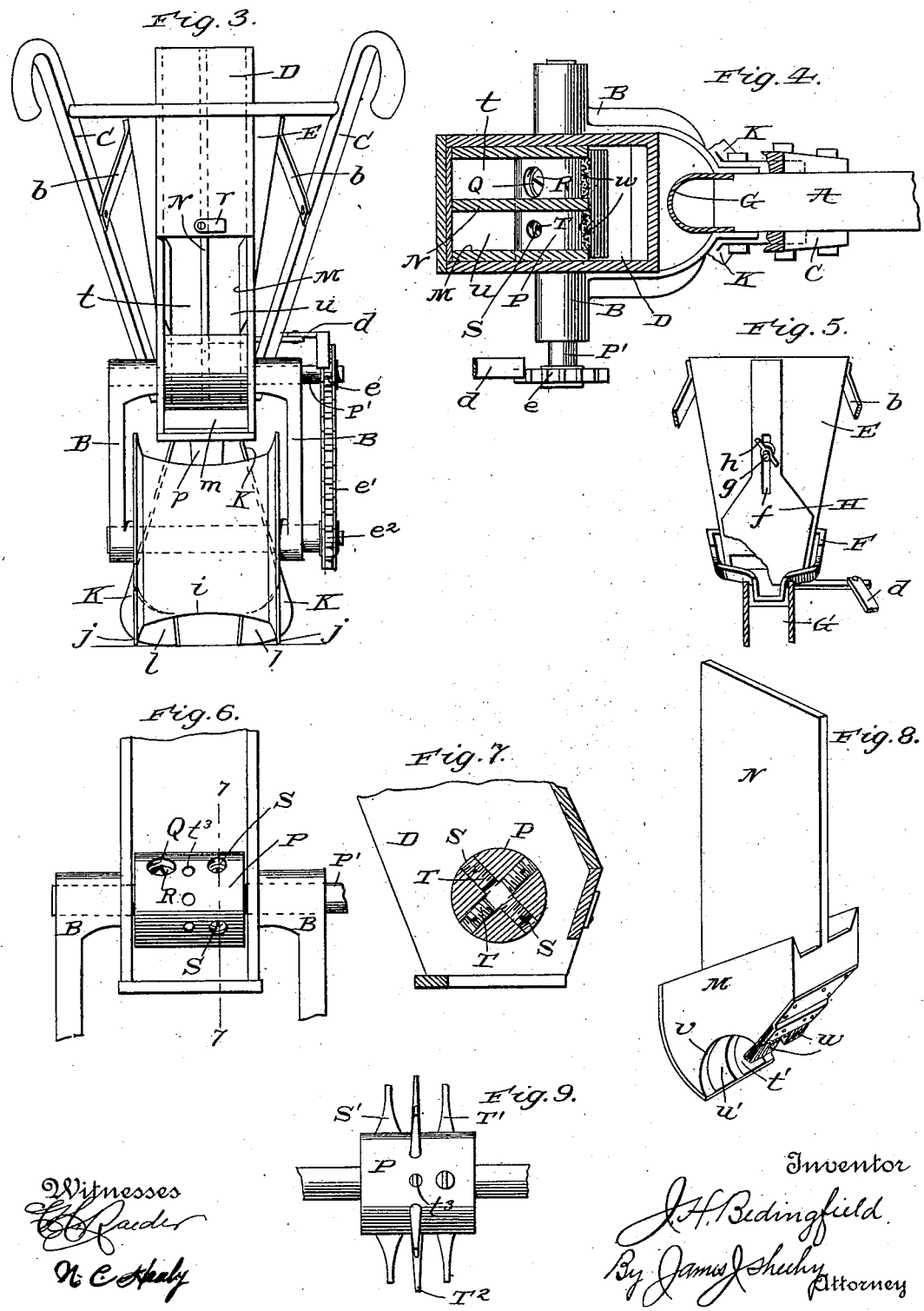

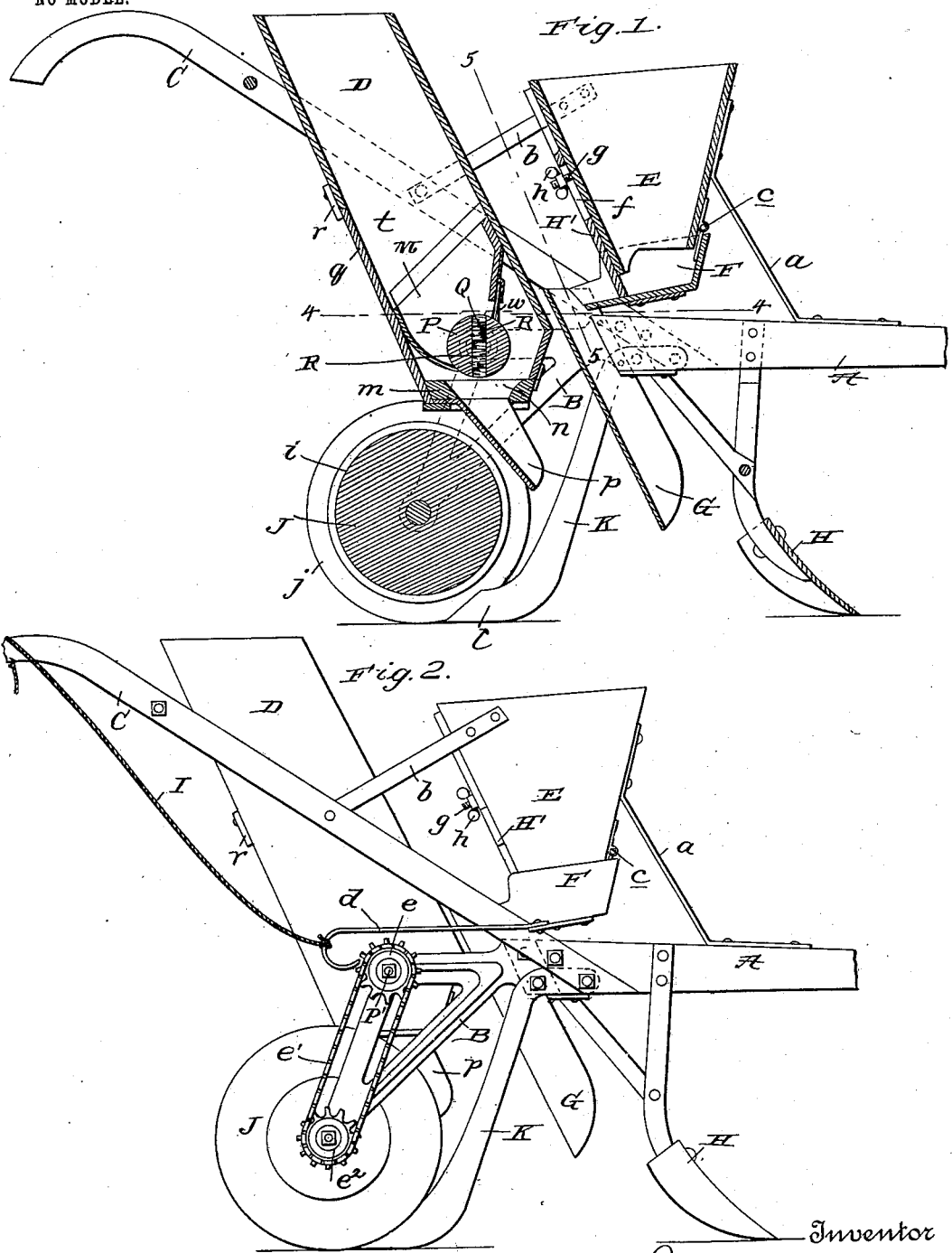

No. 728,660. Patented May 19, 1903.

UNITED STATES PATENT OFFICE.

JOHN H. BEDINGFIELD, OF BETHLEHEM, GEORGIA.

SEED-PLANTER.

SPECIFICATION forming part of Letters Patent No. 728,660, dated May 19, 1903.

Application filed June 9, 1902. Serial No. 110,842. (No model.)

*To all whom it may concern:*

Be it known that I, JOHN H. BEDINGFIELD, a citizen of the United States, residing at Bethlehem, in the county of Walton and State of Georgia, have invented new and useful Improvements in Seed-Planters, of which the following is a specification.

My invention relates to seed-planters, and more particularly to combined seed-planters and fertilizer-distributers; and it has for one of its objects to provide a machine which while simple and compact in construction is highly efficient in opening a furrow, depositing fertilizer therein, and lightly covering the fertilizer with earth precedent to depositing the seed, the light covering of the fertilizer with earth before the deposition of the seed being highly advantageous, since if the seed came into direct contact with the fertilizer the latter would retard and in many cases prevent germination of the seed.

Another object is to provide a machine adapted to plant corn and peas or beans in such manner that the peas or beans are deposited at points intermediate of the points of deposition of the corn.

Another object is to provide a combined corn and pea or bean planter embodying such a construction that when desired either corn or peas or beans alone may be planted.

Another object is to provide a machine embodying such a construction and equipped with such appurtenances that it is adapted to be readily converted from a corn and pea or bean planter into a planter for cotton and other small seeds, and vice versa.

With the foregoing in mind the invention will be fully understood from the following description and claims when taken in conjunction with the accompanying drawings, in which—

Figure 1 is a longitudinal vertical section of my improved seed-planter and fertilizer-distributer as it appears when ready for planting corn and peas or beans, the said section being taken through the corn-compartment of the seedbox. Fig. 2 is a side elevation of the machine. Fig. 3 is a rear elevation of the machine with the removable panel or door of the seedbox displaced. Fig. 4 is a horizontal section taken in the plane indicated by the line 4 4 of Fig. 1. Fig. 5 is a transverse section taken in the plane indicated by the broken line 5 5 of Fig. 1. Fig. 6 is an enlarged detail rear elevation illustrating the seed-discharging cylinder in its proper operative position in the seedbox. Fig. 7 is a section taken in the plane of the broken line 7 7 of Fig. 6. Fig. 8 is an enlarged perspective view of the partition and false bottom of the seedbox removed, and Fig. 9 is a detail elevation illustrating the equipment of the seed-discharging cylinder when the machine is to be used for planting cotton and other small seeds.

Similar letters of reference designate corresponding parts in all of the views of the drawings, referring to which—

A is the beam of my improved machine, which is preferably of wood; B B, hangers, preferably castings or other metallic sections, connected to opposite sides of the beam adjacent to the rear end thereof and extending rearwardly and downwardly therefrom, and C C handles connected to and extending upwardly and rearwardly from the rear portion of the beam. These parts in the preferred embodiment of my invention constitute the main frame of the combined seed-planter and fertilizer-distributer.

D is a seedbox secured between the hangers B and also between the handles C; E, a fertilizer-hopper arranged above the beam A and in advance of the box D and connected by braces *a b* with said beam and box, respectively, and open at its lower end; F, a trough-like shoe arranged to receive fertilizer from the hopper; G, a chute secured in the frame at the rear of the beam A and arranged to receive fertilizer from the shoe F and convey the same downwardly in advance of the discharge of the seedbox D, and H a plow suitably connected to the beam A and disposed in advance of the chute G. By virtue of this relative arrangement of parts it will be observed that when the machine is in operation a small amount of dirt is caused to roll back over and lightly cover the fertilizer before the seed falls, with the result that the seed will be kept from coming in direct contact with the fertilizer. This will be appreciated as an important advantage when it is remembered that fertilizer, such as guano, retards and frequently prevents germination of seeds when it is in direct contact or close to the same. On the other hand, when the seed and guano are separated by a small portion of dirt the dirt will be enriched and the germination of the seed materially accelerated.

The shoe F is hinged at c on the front side of the fertilizer-hopper E and is provided with a rearwardly-extending spring-arm d, the rear end of which is arranged to be engaged by a sprocket-wheel e or other suitable tappet. From this it follows that when the tappet e is rotated and the arm d is in its normal position the shoe F will be vibrated or oscillated vertically and the discharge of fertilizer from the hopper E accelerated.

H' is an adjustable gate, through the medium of which the discharge of fertilizer from the hopper E may be regulated. This gate is arranged at the back of the hopper with its lower end in the shoe F and is longitudinally slotted at f and connected to the hopper by a bolt g and a wing-nut h.

I is a cord connected to the arm d of the shoe F and extending upwardly to one of the handles C. This cord enables the operator of the machine to conveniently hold the said arm d out of engagement with the sprocket-wheel e, so as to prevent oscillation of the shoe F and discharge of fertilizer, as when the machine is being turned at one end of a row or is being drawn from one point to another.

J is a wheel or roller which has for its purpose to press the earth on the seeds with a view of promoting the germination of the seeds. This wheel, which is arranged between and mounted in the hangers B, is preferably provided with a slightly-concave periphery i and flanges j, the said flanges being designed to cut the dirt and press it inwardly on the seeds, so as to cover same.

K K are blades connected to and extending downwardly and rearwardly from the rear portion of the beam A. These blades have lower portions l, disposed obliquely to the wheel-flanges j and reaching laterally outward beyond the planes of the sides of the wheel, and hence they are enabled to gather into the path of the wheel more dirt than the wheel can reach, this with a view of insuring the covering of the deposited seed with dirt, and thereby promoting the germination of the seed.

The seedbox D is provided with a bottom m, having a tapered opening n and a depending spout p, and it is also provided with a removable door q, normally retained in the position shown in Fig. 1 by a turn-button r. The said removable door is designed to permit of the false bottom M and partition N, Fig. 8, being readily placed in and as readily removed from the seedbox. When the said false bottom and partition are in the seedbox, as shown in Fig. 3, the partition serves to divide the box into a corn-compartment t and a pea or bean compartment u. The false bottom M is provided at its lower side with a concavity v of a shape and size to snugly fit over the seed-discharging cylinder P, presently described, and it is also provided with vertical slots t' u', designed to register with and permit seeds to pass downwardly from the compartments t u, respectively. Said false bottom is also provided at the forward ends of the slots t' u' with brushes w, the purpose of which is to prevent any seed being discharged except those contained in the pockets, presently described, of the cylinder P.

Q is a diametrical interiorly-threaded bore formed in the cylinder P in the same vertical plane as the slot t' of the false bottom M and the compartment t of the seedbox, and R R threaded plugs arranged in the said bore and serving in conjunction with the same to form diametrically opposite pockets for the reception of grains of corn. The said plugs are kerfed at their outer ends to adapt them for engagement with a screw-driver, and when they are turned inwardly it will be seen that the capacity of the pockets is increased, while when they are turned outwardly the capacity of the pockets is diminished. It will also be seen that when desired one of the plugs may be arranged flush with the perimeter of the cylinder P, in which event but one pocket will be provided to receive from the corn-compartment and corn will be discharged but once incident to each revolution of the cylinder P. When two pockets are provided in the cylinder in position to receive from the corn-compartment t of the seedbox, corn will obviously be discharged from the machine twice incident to each revolution of the cylinder.

S S are diametrical interiorly-threaded bores of less diameter than the bores Q, formed in the cylinder P in the vertical plane of the slot u' in the false bottom M and the pea or bean compartment u of the seedbox, and T T are threaded and kerfed plugs arranged in the said bores. The bores S and plugs T serve in conjunction to form seed-pockets, the capacity of which may be readily increased or diminished, and it will also be observed that when desired any one or all of the pockets may be eliminated by making one or all of the plugs flush with the perimeter of the cylinder. From this it follows that when it is desired to adapt the machine to plant corn alone it is simply necessary to make all of the plugs T flush with the perimeter of the cylinder P, while when it is wished to plant peas or beans alone the plugs R are made flush with the perimeter of the cylinder.

When desired, the bores S of the cylinder P may be so disposed with reference to the bores Q as to drop peas or beans just halfway between the hills of corn.

The cylinder P is carried by a shaft P', which is journaled in the hangers B and also carries the sprocket-wheel e, and since the said sprocket-wheel e is connected by a belt e' with a sprocket-wheel $e^2$ on one trunnion of the wheel J it will be observed that when the machine is in motion the cylinder P will be rotated in the same direction as the wheel J.

The distance between the hills of seeds may be regulated either by adjusting the plugs in the bores of the cylinder P or employing different sizes of sprocket-wheels on the shaft P' and the trunnion of the wheel J.

When it is desired to convert my improved machine from a corn and pea or bean planter to a cotton-planter, the false bottom M and partition N are removed from box D, the plugs R and T are turned inwardly in the bores Q S, respectively, of the cylinder P, and spikes S' T' are screwed into the said bores. Longer spikes $T^2$, Fig. 9, are screwed into middle bores or sockets $t^3$ in the cylinder P, and then the machine is ready for planting cotton and other small seeds and will be found highly efficient in performing such function.

I prefer in practice to removably arrange the bottom $m$ of the seedbox on ledges at the lower end of the box and secure it normally in such position by a turn-button, as shown in Fig. 1.

I have entered into a detailed description of the construction and relative arrangement of parts embraced in the present and preferred embodiment of my invention in order to impart a full, clear, and exact understanding of the same. I do not desire, however, to be understood as confining myself to such specific construction and arrangement of parts, as such changes or modifications may be made in practice as fairly fall within the scope of my claims.

Having described my invention, what I claim, and desire to secure by Letters Patent, is—

1. In a seed-planter, the combination of a frame, a wheel mounted therein and having peripheral flanges at its sides, a seedbox carried by the frame and arranged to discharge in front of said wheel, blades connected to the frame and having lower portions disposed obliquely in front of the flanges of the wheel, and a plow arranged in advance of the said blades.

2. In a seed-planter, the combination of a seedbox having a discharge-opening at its lower end, a rotary cylinder mounted in said box, and having a threaded socket, and a threaded plug adjustable in said socket and serving in conjunction with the same to form a seed-pocket, means for rotating said cylinder, and a false bottom arranged in the seedbox above the cylinder, and having a concavity at its under side snugly receiving said cylinder, and an opening, and also having means at one end of said opening for preventing the passage of seed between it and the perimeter of the cylinder.

3. In a seed-planter, the combination of a seedbox having a discharge at its lower end, a rotary cylinder mounted in said box and having threaded sockets and threaded plugs adjustable in said sockets and serving in conjunction with the same to form seed-pockets, means for rotating said cylinder, a false bottom arranged in the seedbox above the cylinder, and having a concavity at its under side snugly receiving said cylinder, and openings, and also having means at one end of said openings for preventing the passage of seed between it and the perimeter of the cylinder, and a partition connected to and rising from the false bottom in a plane between those of the openings in the said bottom whereby the seedbox is divided into compartments for different kinds of seed.

4. In a seed-planter, the combination of a seedbox having a discharge-opening at its lower end, and also having a removable door, and means for normally securing the same in its closed position, a rotary cylinder mounted in said box and having threaded sockets and threaded plugs adjustable in said sockets and serving in conjunction with the same to form seed-pockets, means for rotating said cylinder, a false bottom removably arranged in the seedbox above the cylinder, and having a concavity at its under side snugly receiving said cylinder, and openings, and also having brushes at one end of said openings engaging the cylinder, and a partition permanently connected to and rising from the false bottom in a plane between the openings of the bottom; said partition being removable with the bottom from the seedbox.

5. The combination in a seed-planter, of a seedbox, a rotary cylinder mounted in the box and having a threaded socket, and a threaded plug adjustable in said socket and serving in conjunction therewith to form a seed-pocket, means for rotating the cylinder, and a wall arranged in the box, and having a concavity receiving the cylinder and an opening, and also having a brush at one end of said opening, engaging the cylinder.

In testimony whereof I have hereunto set my hand in presence of two subscribing witnesses.

JOHN H. BEDINGFIELD.

Witnesses:
J. O. LAWRENCE,
J. F. GREEN.